(12) United States Patent
Grosskopf

(10) Patent No.: US 10,704,704 B2
(45) Date of Patent: Jul. 7, 2020

(54) PERMANENT MAGNET GENERATOR CASE VENT VALVE

(71) Applicant: Hamilton Sundstrand Corporation, Charlotte, NC (US)

(72) Inventor: Andrew P. Grosskopf, Rockford, IL (US)

(73) Assignee: Hamilton Sundstrand Coproration, Charlotte, NC (US)

( * ) Notice: Subject to any disclaimer, the term of this patent is extended or adjusted under 35 U.S.C. 154(b) by 432 days.

(21) Appl. No.: 15/649,761

(22) Filed: Jul. 14, 2017

(65) Prior Publication Data

US 2019/0017620 A1 Jan. 17, 2019

(51) Int. Cl.
| | | |
|---|---|---|
| F16K 31/06 | (2006.01) | |
| H02K 35/02 | (2006.01) | |
| F16K 31/04 | (2006.01) | |
| F16K 31/10 | (2006.01) | |
| H01F 7/02 | (2006.01) | |
| H02K 5/10 | (2006.01) | |
| F16K 24/04 | (2006.01) | |
| H02K 7/116 | (2006.01) | |
| H02K 5/124 | (2006.01) | |

(52) U.S. Cl.
CPC ........ *F16K 31/0627* (2013.01); *F16K 31/046* (2013.01); *F16K 31/0606* (2013.01); *F16K 31/10* (2013.01); *H01F 7/0273* (2013.01); *H02K 5/10* (2013.01); *H02K 35/02* (2013.01); *F16K 24/04* (2013.01); *H02K 5/124* (2013.01); *H02K 7/116* (2013.01); *H02K 2205/09* (2013.01); *H02K 2213/09* (2013.01)

(58) Field of Classification Search
CPC ............... F16K 31/0627; F16K 31/046; F16K 31/0606; F16K 31/10; H01F 7/0273; H02K 5/10; H02K 35/02
See application file for complete search history.

(56) References Cited

U.S. PATENT DOCUMENTS

| | | | |
|---|---|---|---|
| 3,840,045 A | 10/1974 | Grosseau | |
| 4,883,995 A * | 11/1989 | Rink, Jr. ................ | H02K 5/124 310/55 |
| 6,844,707 B1 | 1/2005 | Raad | |

(Continued)

FOREIGN PATENT DOCUMENTS

| | | |
|---|---|---|
| DE | 9418307 U1 | 4/1996 |
| EP | 2211445 A2 | 7/2010 |
| JP | 2008-228378 A | 9/2008 |

OTHER PUBLICATIONS

European Search Report for EP Application No. 18183639.6 dated Dec. 6, 2018.

*Primary Examiner* — Bernard Rojas
(74) *Attorney, Agent, or Firm* — Carlson, Gaskey & Olds, P.C.

(57) ABSTRACT

An electric generator has a rotor shaft to be driven to rotate with a generator rotor. A generator stator is positioned adjacent the generator rotor. A housing surrounds the generator rotor and the generator stator. The generator rotor shaft extends outwardly of the housing. A seal seals a location where the rotor shaft extends outwardly of the housing. A vent valve is configured to vent of the interior of the housing when the rotor shaft is not rotating. An electrical assembly is also disclosed. An electrical assembly is also disclosed.

20 Claims, 2 Drawing Sheets

(56) References Cited

U.S. PATENT DOCUMENTS

| | | |
|---|---|---|
| 7,651,069 B2 | 1/2010 | Kopecek et al. |
| 8,302,390 B2 | 11/2012 | Ivens et al. |
| 2010/0189545 A1* | 7/2010 | Annigeri ................ H02K 5/124 |
| | | 415/110 |
| 2011/0309780 A1 | 12/2011 | Bandaru et al. |
| 2013/0046426 A1 | 2/2013 | Tsukashima et al. |
| 2016/0164372 A1* | 6/2016 | Zehnle ................... F01D 15/10 |
| | | 290/52 |

* cited by examiner

PERMANENT MAGNET GENERATOR CASE VENT VALVE

BACKGROUND OF THE INVENTION

This application relates to an electrical generator wherein a vent valve is provided to vent the interior of a housing case at shutdown.

Electric generators are known and typically include a shaft driven by a source of rotation to rotate a generator rotor adjacent to a generator stator. With this rotation, electricity is generated and used for any number of uses.

One known electric generator is housed in a housing and a generator rotor shaft extends outwardly of the housing. A liftoff seal is provided to seal the location where the shaft leaves the housing. As known, liftoff seals can gradually build up internal case pressure of the generator on subsequent start-stop cycles.

It is also known to provide a pressure relief valve on the housing case to allow venting of the interior of the housing case should a pressure become undesirably high. However, in the past, the relief valves have opened an undesirably high number of times under some applications due to the pressure build up from the lift off seal.

When the relief valve opens during operation of the electrical generator, it is possible for lubricant captured within the housing to flow outwardly of the housing.

This is, of course, undesirable because with several cycles, eventually the generator could become low in oil before the normal service interval.

SUMMARY OF THE INVENTION

An electric generator has a rotor shaft to be driven to rotate with a generator rotor. A generator stator is positioned adjacent the generator rotor. A housing surrounds the generator rotor and the generator stator. The generator rotor shaft extends outwardly of the housing. A seal seals a location where the rotor shaft extends outwardly of the housing. A vent valve is configured to vent of the interior of the housing when the rotor shaft is not rotating. An electrical assembly is also disclosed.

An electrical assembly is also disclosed.

These and other features may be best understood from the following drawings and specification.

DETAILED DESCRIPTION

Figure 1:
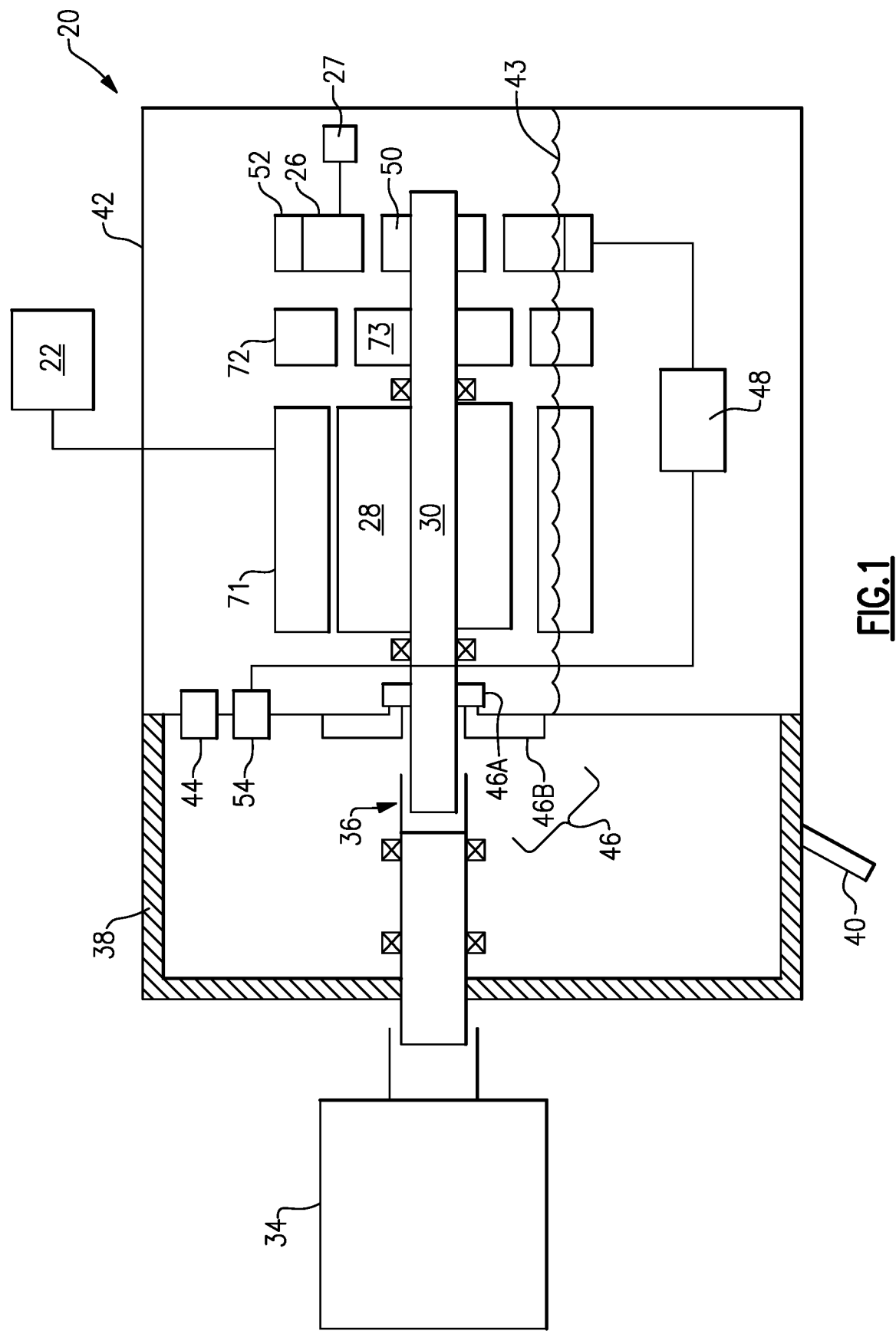
FIG. 1 schematically shows an electric generator and its associated housing.

FIG. 1 shows an electric generator assembly 20. As known, the generator generates electricity for a use 22, shown schematically. In one application, this generator is a permanent magnet generator and the use 22 may be for various uses of electricity on an aircraft.

However, it should be understood that other types of generators besides permanent magnet generators and other uses besides aircraft applications may benefit from the teachings of this disclosure.

Generator stator coils 71 are positioned outwardly of a permanent magnet rotor 28. The stator 71 and rotor 28 are in operable communication to generate electricity. The permanent magnet rotor 28 rotates with a generator shaft 30. A shaft 32 extends outwardly of a housing 38 and to a source of rotation 34. In one application, the source of rotation 34 may be a gas turbine engine, such as found on aircraft engines. Again, other sources of rotation may be utilized.

A gear connection 36 is shown schematically. As understood, the gearbox housing 38 may house a number of gears such that a change of speed between the input shaft 32 and the generator shaft 30 can occur.

A drain 40 drains leaked lubricant from housing 38 to a central collection point or overboard.

A casing or housing 42 surrounds the generator and geared speed trimming device (if applicable). A nominal oil level 43 is shown.

A pressure relief valve 44 is positioned on the housing 42, as known.

A liftoff seal 46 is shown sealing a location where the shaft 30 leaves the housing 42. As mentioned above, the liftoff seal 46 is intended to pump air across the seal during operation. The amount of air being pumped is very small, but over time can build up the case pressure to the point when the pressure relief valve 44 could open and discharge oil and spill out the drain 40.

The seal 46 may be two parts. Part 47A rotates with shaft 30. Part 47B is mounted in housing 42. Part 47B does not rotate and is spring loaded to make contact with part 46A.

However, applicant has found that the liftoff seals 46 do not always allow the pressure to move down when the machine is not rotating. Instead, the pressure may hold when the machine is not rotation and may move up incrementally with each start/stop cycle. Thus, the pressure within the housing 42 can become undesirably high.

This can lead to nuisance openings of the pressure relief valve 44, which is undesirable as lubricant may leak outwardly. As such, a vent valve 54, separate from the seal, is provided.

The vent valve, in one embodiment, is a solenoid actuated valve 54 provided to ensure the pressure within the housing 42 will move fully downwardly at shutdown. The solenoid actuated valve 54 may be located above the static oil level (level of oil in the machine when not rotating). The solenoid actuated valve 54 may also be located as close as possible to the highest elevation within the machine and oriented to vent between the gearbox pad and generator. As shown, a rectifier 48 receives electric energy from a solenoid generator coil 52. The rectifier 48 converts AC power from the Permanent Magnet Generator (PMG) to DC power that the solenoid coils can use. Generator coil 52 is associated with a permanent magnet 50. The rectifier 48 supplies power to the solenoid actuated valve 54.

An exciter stator 72 is positioned outwardly of an exciter rotor 73, and provides an exciter function, as is generally known. A supplemental stator 26 may also be associated with permanent magnet 50. This stator coil 26 may generate electricity to be used by auxiliary components 27, such as a general control unit.

Thus, when shaft 30 rotates, magnet 50 rotates. Then, once the rotating hardware reaches a desired speed, the PMG is designed to supply sufficient power to actuate the solenoid valve 54 and will close.

As can be appreciated from FIG. 1, the rectifier 48 is positioned under the nominal oil level 43. Thus, the oil level will cool the rectifier assembly.

When the generator is not rotating, electricity will not be generated between the magnet 50 and coil 52. The solenoid will then be de-energized and will move to its nominal open position. In the nominal open position, the solenoid allows air within the housing 42 to vent into the gearbox housing 38 lowering the pressure within the housing 42.

Figure 2A:
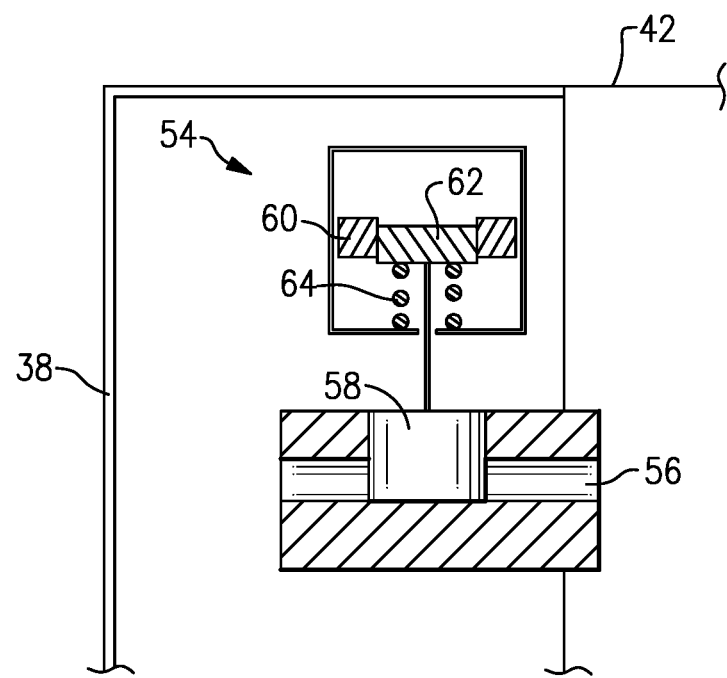
FIG. 2A shows a solenoid valve in a blocked position.

FIG. 2A schematically shows a solenoid valve 54. As shown, a leakage path 56 extends from the interior of the housing 42 into gearbox 38. A solenoid piston 62 is associated with a coil 60. Spring 64 biases the piston 62 upwardly as shown in FIG. 2A. In the position illustrated in FIG. 2A, power is received by the coil 60 and the piston 58 is moved downwardly against the force of the spring 64, blocking flow through the passage 56.

Figure 2B:
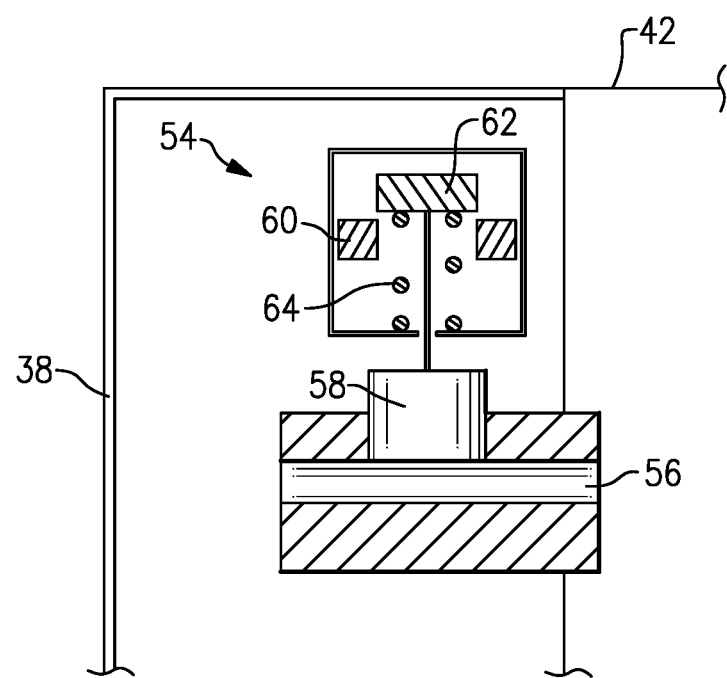
FIG. 2B shows a solenoid valve in an open position.

FIG. 2B shows the solenoid in a nominal or open position when power is not supplied to the coil 60. The spring 64 now moves the piston 58 upwardly such that the flow path 56 is open, and pressure within the housing 42 will vent.

As can be understood, when the electrical generator 20 is being driven to rotate, power will be generated between magnet 50 and coil 52. The power passes through the rectifier assembly 48 and powering the solenoid 54. Prior to the beginning of this rotation, the solenoid will be in the FIG. 2B position and the interior of the housing 42 will be vented. However, once the electricity generated by the rotation of the rotor shaft 30 builds up, power will be supplied to the solenoid 54 and it will move to the FIG. 2A position. The casing will no longer be vented. The advantage of closing the case during operation is that oil will not leak out through an open hole, case pressure will build up slightly and increase the efficiency of any pumps that are internal on the machine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An electric generator comprising:
a rotor shaft to be driven to rotate with a rotor;
a stator in operable communication with said rotor;
a housing surrounding said rotor and said stator;
said rotor shaft extending outwardly of said housing, and a seal sealing a location where said rotor shaft extends outwardly of said housing;
a vent valve, separate from said seal, and configured for allowing venting of the interior of said housing when said rotor shaft is not rotating; and
said vent valve is electrically operated such that electrical power is sent to said vent valve when said rotor shaft is rotating to maintaining said vent valve in a non-venting position, and the supply of electrical power to said vent valve is stopped such that said vent valve is biased to a vent position when said rotor shaft is not rotating.

2. The electric generator as set forth in claim 1, wherein said vent valve is a solenoid actuated valve biased to said vent position and driven to said non-venting position after said rotor shaft begins rotation.

3. The electric generator as set forth in claim 2, wherein said rotor and said stator are configured to generate power to be supplied to said vent valve to move said vent valve from said vent position to said non-venting position when said rotor shaft is driven to rotate.

4. The electric generator as set forth in claim 3, wherein said stator and said rotor are separate from a main rotor and a main stator which generate electricity.

5. The electric generator as set forth in claim 4, wherein said main rotor includes permanent magnets such that the electrical generator is a permanent magnet generator.

6. The electric generator as set forth in claim 3, wherein an electric line connects said stator to said vent valve, and includes a rectifier for converting AC power to DC power.

7. The electric generator as set forth in claim 6, wherein said housing includes a nominal oil level and said rectifier is positioned beneath said nominal oil level to provide cooling for said rectifier.

8. The electric generator as set forth in claim 3, wherein an electric line connects said stator to said vent valve, and includes a rectifier, said housing includes a nominal oil level and said rectifier is positioned beneath said nominal oil level to provide cooling for said rectifier, said seal is a liftoff seal, said rotor shaft extends outwardly of said housing into a gearbox and said vent valve venting said interior of said housing into an interior of said gearbox.

9. An electric generator comprising:
a rotor shaft to be driven to rotate with a rotor;
a stator in operable communication with said rotor;
a housing surrounding said rotor and said stator;
said rotor shaft extending outwardly of said housing, and a seal sealing a location where said rotor shaft extends outwardly of said housing;
a vent valve, separate from said seal, and configured for allowing venting of the interior of said housing when said rotor shaft is not rotating; and
wherein said rotor shaft extends outwardly of said housing into a gearbox and said vent valve vents said interior of said housing into an interior of said gearbox.

10. The electric generator as set forth in claim 1, wherein a pressure relief valve opens to vent the interior of said housing should a pressure within the interior of said housing exceed a selected value.

11. An assembly comprising:
a gas turbine engine driving an output shaft, said output shaft extending to drive an electric generator, and said electric generator is configured to generate electricity for a use on an aircraft;
said electric generator including a rotor shaft coupled to be driven by said output shaft, and said rotor shaft to be driven to rotate with a rotor;
a stator in operable communication with said rotor;
a housing surrounding said rotor and said stator;
said rotor shaft extending outwardly of said housing, and a seal sealing a location where said rotor shaft extends outwardly of said housing;
a vent valve, separate from said seal, and configured for allowing venting of the interior of said housing when said rotor shaft is not rotating; and
said vent valve is electrically operated such that electrical power is sent to said vent valve when said rotor shaft is rotating to maintain said vent valve in a non-venting position, and the supply of electrical power to said vent valve is stopped such that said vent valve is biased to a vent position when said rotor shaft is not rotating.

12. The assembly as set forth in claim 11, wherein said vent valve is a solenoid valve biased to said vent position and driven to said non-venting position after said rotor shaft begins rotation.

13. The assembly as set forth in claim 12, wherein said rotor and said stator are configured to generate power to be supplied to said vent valve to move said vent valve from said vent position to said non-venting position when said rotor shaft is driven to rotate.

14. The assembly as set forth in claim 13, wherein said stator and said rotor are separate from a main rotor and a main stator which generate electricity.

15. The assembly as set forth in claim 14, wherein said main rotor includes permanent magnets such that electrical generator is a permanent magnet generator.

16. The assembly as set forth in claim 13, wherein an electric line connecting said stator to said vent valve includes a rectifier.

17. The assembly as set forth in claim 16, wherein said housing includes a nominal oil level and said rectifier is positioned beneath said nominal oil level to provide cooling for said rectifier.

18. The assembly as set forth in claim 11, wherein said rotor shaft extends outwardly of said housing into a gearbox and said vent valve venting said interior of said housing into an interior of said gearbox.

19. The assembly as set forth in claim 11, wherein a pressure relief valve opens to vent the interior of said housing should a pressure within the interior of said housing exceed a predetermined limit.

20. The assembly as set forth in claim 13, wherein an electric line connects said stator to said vent valve, and includes a rectifier, said housing includes a nominal oil level and said rectifier is positioned beneath said nominal oil level to provide cooling for said rectifier, said seal is a liftoff seal, said rotor shaft extends outwardly of said housing into a gearbox and said vent valve venting said interior of said housing into an interior of said gearbox.

\* \* \* \* \*